US006408532B1

(12) United States Patent
Keys et al.

(10) Patent No.: US 6,408,532 B1
(45) Date of Patent: Jun. 25, 2002

(54) S-GAUGE

(75) Inventors: James R. Keys, Concord; David L. Shockley, Pleasanton, both of CA (US)

(73) Assignee: The Clorox Company, Oakland, CA (US)

( * ) Notice: Subject to any disclaimer, the term of this patent is extended or adjusted under 35 U.S.C. 154(b) by 9 days.

(21) Appl. No.: 09/704,460

(22) Filed: Nov. 1, 2000

(51) Int. Cl.[7] .................................................. G01B 5/00

(52) U.S. Cl. ......................... 33/833; 33/199 R; 33/522; 33/549; 33/555

(58) Field of Search ............................... 33/199 R, 522, 33/833, 832, 551, 549, 679.1, 199 B, 553, 555

(56) References Cited

U.S. PATENT DOCUMENTS

| | | | | | |
|---|---|---|---|---|---|
| 1,337,018 A | * | 4/1920 | Lockey et al. | ............ | 33/199 R |
| 1,939,643 A | * | 12/1933 | Beardsley | ................. | 33/199 R |
| 2,004,230 A | * | 6/1935 | Von Till | ................... | 33/199 R |
| 2,525,136 A | * | 10/1950 | Ingle | ........................ | 33/199 R |
| 2,687,575 A | * | 8/1954 | Acton et al. | .................. | 33/522 |
| 3,073,034 A | * | 1/1963 | Antoszewski | ................ | 33/522 |
| 3,249,223 A | * | 5/1966 | Johnson et al. | ............... | 33/549 |
| 3,782,542 A | * | 1/1974 | Scribner | ...................... | 209/74 |
| 4,135,306 A | * | 1/1979 | Hannon | ..................... | 33/199 B |
| 4,184,265 A | * | 1/1980 | Horton | ..................... | 33/199 R |
| 4,641,437 A | | 2/1987 | Willis | | |
| 4,936,018 A | * | 6/1990 | Robinson et al. | ............. | 33/522 |
| 5,313,714 A | * | 5/1994 | Nakao | ......................... | 33/522 |
| 5,351,410 A | | 10/1994 | Hainneville | | |
| 5,388,707 A | * | 2/1995 | Stivison et al. | ............... | 33/522 |
| 5,414,939 A | | 5/1995 | Waugaman | | |
| 5,870,833 A | | 2/1999 | Van Bebber et al. | | |
| 6,041,512 A | | 3/2000 | Wacke | | |

FOREIGN PATENT DOCUMENTS

| | | | | | |
|---|---|---|---|---|---|
| JP | 60100703 A | * | 6/1985 | ............... | 33/199 R |

* cited by examiner

*Primary Examiner*—Diego Gutierrez
*Assistant Examiner*—Mirellys Jagan
(74) *Attorney, Agent, or Firm*—DiPinto & Shimokaji, P.C.

(57) ABSTRACT

A measuring device for measuring the thread start distance of a thread formed on an outer surface of a container finish is provided. The measuring device includes a base having a first surface for receiving a rim of a container finish, a support member, a gauge, and a counterweight to balance the measuring device on the finish. The support member is movably attached to the base and adjacent the first surface. A side surface of the support element is in contact with the container finish. The gauge is attached to the base and a gauge actuator having a roller contact member is operatively associated with the gauge. The gauge actuator measures the distance between the rim of the container finish and a thread start point of the thread of the container finish, S-dimension, as the gauge actuator moves along an upper base line of the thread.

19 Claims, 5 Drawing Sheets

S-GAUGE

BACKGROUND OF THE INVENTION

1. Field of the Invention

The present invention generally relates to measuring devices and, more particularly, to a device for measuring an S-dimension of container finishes.

2. Description of the Related Art

In the manufacture of containers, certain dimensions are required to be within predetermined tolerance limits in order for the containers to function properly. In particular, the upper surface of the container, commonly known as the finish, must be maintained within certain manufacturing tolerances in order to provide adequate cap retention for a liquid tight seal to be formed between the container finish and the container cap.

Variations in the dimensions of containers, particularly plastic containers, may occur during molding or trimming operations due to many factors, including differences in the molds used to form the containers, shrinkage of the containers after molding, materials used, curing temperatures, and trimming operations.

In order to determine whether produced containers, such as bottles, are within predetermined dimensional tolerances, generally a sampling of the bottles being produced is measured to determine actual dimensions. This is especially true for the finish (i.e., neck portion) of the bottles. For bottles which will hold fluids, including consumer products such as detergents and bleaches, it is important that the S-dimension (i.e., start of thread dimension) is within predetermined dimensional tolerances so that a bottle cap will be retained properly on the finish and leaks will be prevented. The S-dimension is defined as the distance between the top of the sealing surface and the top of the thread or the uppermost location where a thread can extend as it is extended around the finish. The S-dimension is measured from the minor diameter of the thread or the base of the thread where the thread adjoins the outer wall of the finish.

The S-dimension of a container finish can be determined by manual measurement with a caliper. However, such measurements will include inaccuracies which vary depending on the expertise of a particular user. The inaccuracies occur due to the manual placement of the caliper, variations in the manual force applied to the caliper, and the caliper blades cutting into the soft material of the bottle finish, such as when the bottle is made of a blown thermoplastic. If the calipers are tilted just a slight amount, the reading will fluctuate. Therefore, the measurements are very difficult to repeat.

As an alternative to manual measurement with a caliper, container finishes may also be measured by an optical comparator. The optical comparator takes an enlarged shadow-graph of the bottle finish to provide a highly accurate measurement of the finish diameter. However, optical comparators are quite expensive and are generally not available at the location where the bottles are made. Therefore, when using an optical comparator, bottles often must be shipped to a laboratory for measurement, providing a very delayed determination of dimensional tolerances. As a result, a large number of reject bottles may be made before the error is corrected by adjustments to the blow molding and/or trimming processes.

In view of the above drawbacks of the known methods for measuring S-dimension of a container finish, it would be desirable to provide a measuring device for accurately measuring the S-dimension of a container finish rapidly and with minimal user error.

SUMMARY OF THE INVENTION

In one aspect of the present invention, a measuring device for measuring the thread start distance of a thread formed on an outer surface of a first container finish includes a base comprising a first surface for receiving a rim of the first container finish, a support member movably attached to the base and adjacent the first surface such that a side surface of the support member is in contact with the first container finish, a gauge attached to the base, and a gauge actuator operatively associated with the gauge. The gauge actuator measures a distance between the rim of the first container finish and a thread start point of the thread of the container finish as the gauge actuator moves along an upper base line of the thread. Specifically, the distance between the rim of the first container finish and a thread start point is the thread start distance of the first container finish. The measuring device further includes a counterweight attached to the base to balance the measuring device on the first container finish.

In another aspect of the present invention, a process for measuring the thread start distance of a thread formed on an outer surface of a container finish includes the steps of positioning a first surface of a measuring device on an upper end of the container finish, moving a support member of the measuring device in contact with a side wall of the container finish, contacting a gauge actuator with an upper base line of the thread wherein the gauge actuator is operatively connected to a gauge having a display; and moving the gauge actuator along the upper base line of the thread so as to measure a vertical distance between a thread start point and the rim of the container finish.

These and other features, aspects and advantages of the present invention will become better understood with reference to the following drawings, description and claims.

DETAILED DESCRIPTION OF THE INVENTION

Figure 1:
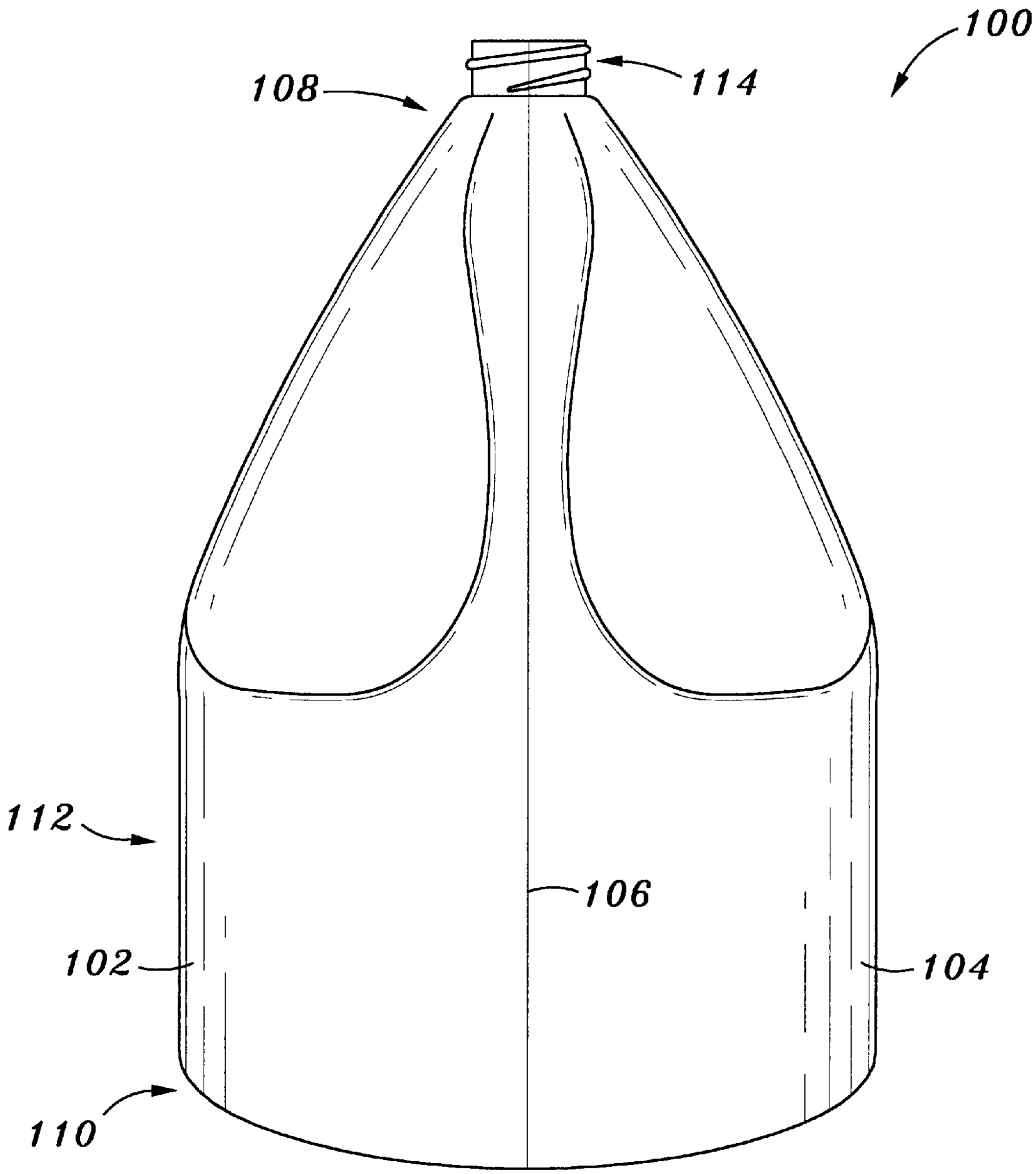
FIG. 1 is a schematic view of a fluid container having a finish portion.

Reference will now be made to the drawings wherein like numerals refer to like parts throughout. FIG. 1 illustrates an exemplary plastic container 100, such as a bottle, to hold fluids such as detergent or bleach, or the like. The bottle may be manufactured by combining a first half 102 and a second half 104 through a molding part line 106 using well-known processes in the art of container manufacturing. In the preferred embodiment, the bottle may be made of high-density polyethylene. The bottle 100 may comprise a top portion 108 with a bottom portion 110, and a body 112 of the bottle 100 is configured to retain fluids. A finish portion 114 is formed as an opening shaped as a neck or a short tube where the fluids are filled into or dispensed out of the bottle 100.

Figure 2A:
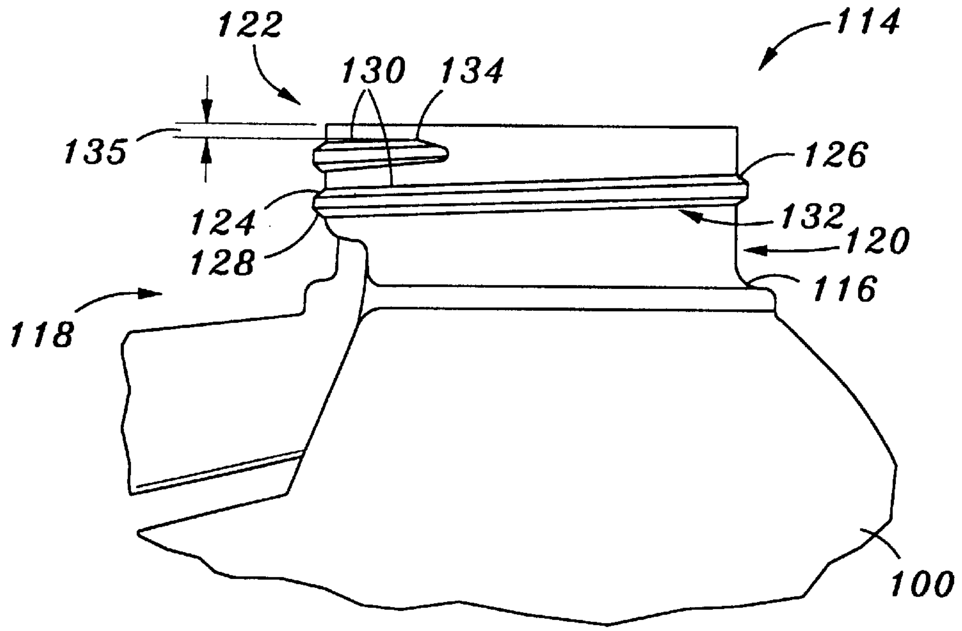
FIG. 2A is a detailed schematic view of the finish portion shown in FIG. 1.

As shown in FIG. 2A, the finish portion 114 of the bottle 100 may be integrally connected to the body 112 through a shoulder portion 116 or shelf at a lower end 118 of the finish 114. An outer circumferential side wall 120 extends between the lower end 118 and an upper end 122 of the finish 114. On the outer circumferential side wall 120, the bottle finish 114 may have threads 124 for retaining a cap (not shown). In this embodiment, the threads 124 are defined by an upper surface 126 and a lower surface 128. The threads 124 project outwardly and extend along a spiral path around the finish 114. Further, the threads 124 extend generally, but not necessarily, between the upper and lower end 118 and 122 of the finish 114. The upper surface 126 of the threads 124 may adjoin the side wall 120 under an obtuse angle and along an upper base line 130. Similarly, the lower surface 128 may adjoin the side wall 120 along a lower base line 132. The upper base line 130 terminates at a thread start point 134 which forms the uppermost end of the thread 124 as in the manner shown in FIG. 2A. In this embodiment, the thread start point 134 is the first reference feature of an S-dimension 135.

Figure 2B:
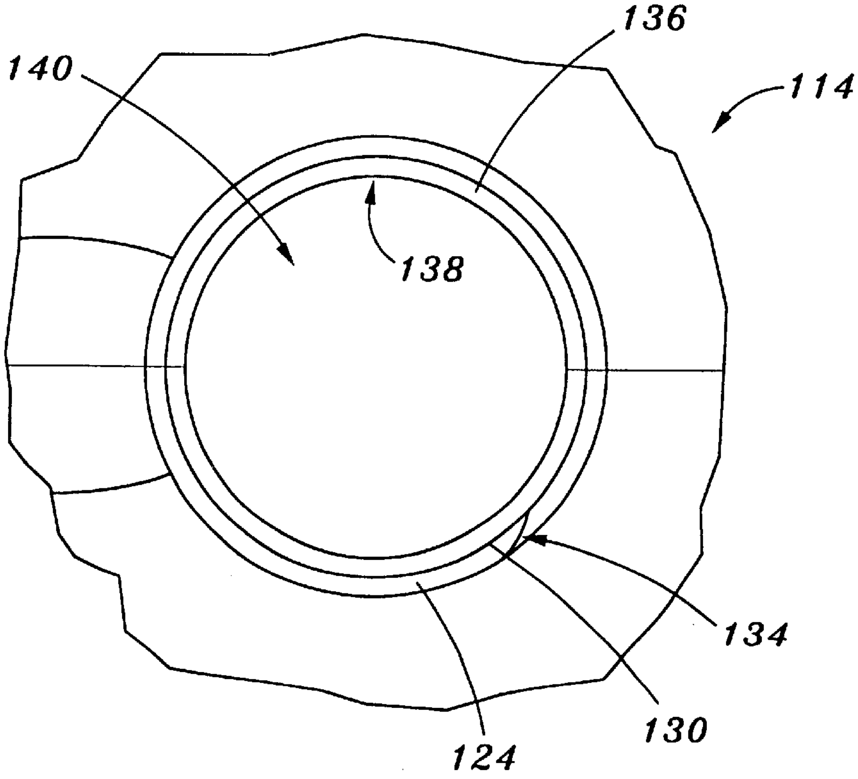
FIG. 2B is a top view of the finish portion shown in FIG. 2A.

As illustrated in FIG. 2B, in a top view of the bottle 100, the finish 114 may comprise an upper surface 136 or rim and inner circumferential side wall 138 defining a finish opening 140. In this embodiment, the upper surface 136 forms a second reference feature of the S-dimension 135. Accordingly, in this embodiment the S-dimension is the vertical distance between the thread start point 134 and the upper surface 136 of the finish 114. As previously mentioned, for containers which will hold fluids, including consumer products such as detergents and bleaches, it is important that the S-dimension of the container be within predetermined dimensional tolerances so that a cap will be retained properly on the finish and leaks will be prevented. Therefore, the S-dimension of the bottles must be routinely measured to determine whether the distance 135 between the upper surface 136 and the thread start point 134 is in predetermined manufacturing limits. A gauge system 200 of the present invention provides an effective tool to facilitate this measurement process.

Figure 3A:
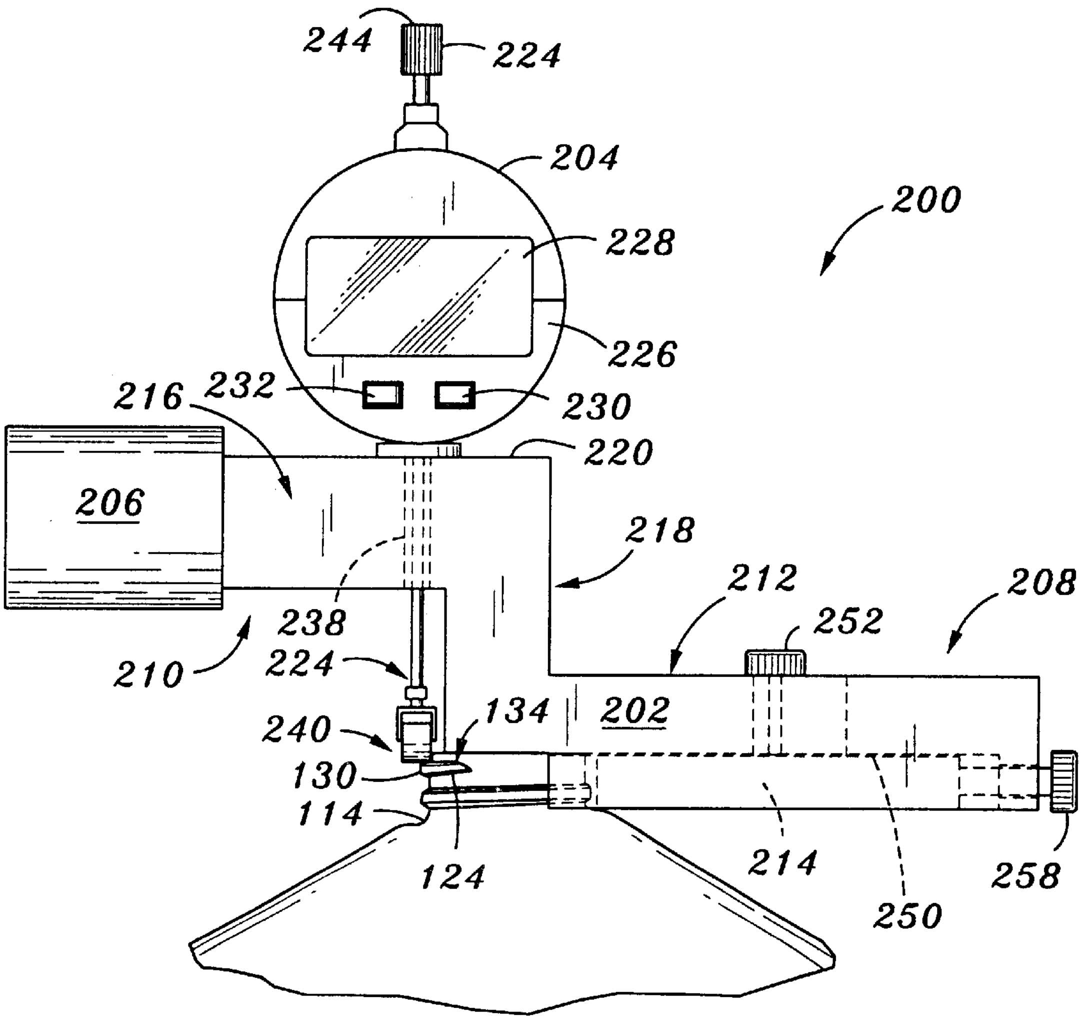
FIG. 3A is a side view of the gauge system of the present invention that is mounted on a bottle finish for measuring the S-distance.
Figure 3B:
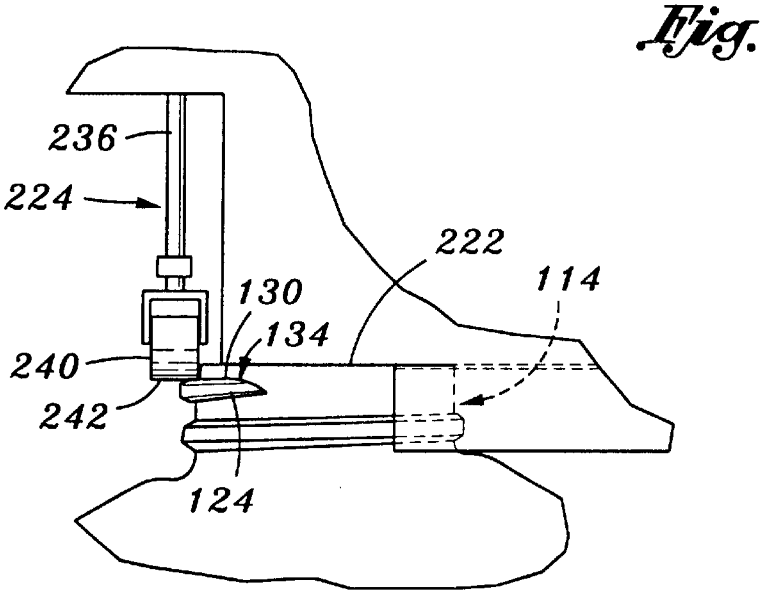
FIG. 3B is a detailed schematic view of the gauge actuator of the present invention.

FIGS. 3A and 3B show the gauge system 200 of the present invention which is placed on the finish portion 114 of the bottle 100 during the measurement process. The gauge system 200 of the present invention may comprise a base 202, a gauge 204, and a counterweight 206. The counterweight 206 comprises a cylindrical weight member that allows the system 200 to be balanced on the finish portion 114. The base 202 comprises a first side 208, a second side 210, a top surface 212 and a bottom surface 214. The counterweight 206 is attached to and extends from the second side 210 on which the gauge 204 is positioned. In this embodiment, the second side 210 of the base 202 is comprised of an L-bracket having a first arm member 216 perpendicularly attached to a second arm member 218. The L-bracket 210 is secured to the upper surface 212 of the base 202 through the second arm member 218 such that an upper surface 220 of the first arm member 216 is substantially parallel to the upper surface 212 of the base 202.

Figure 5:
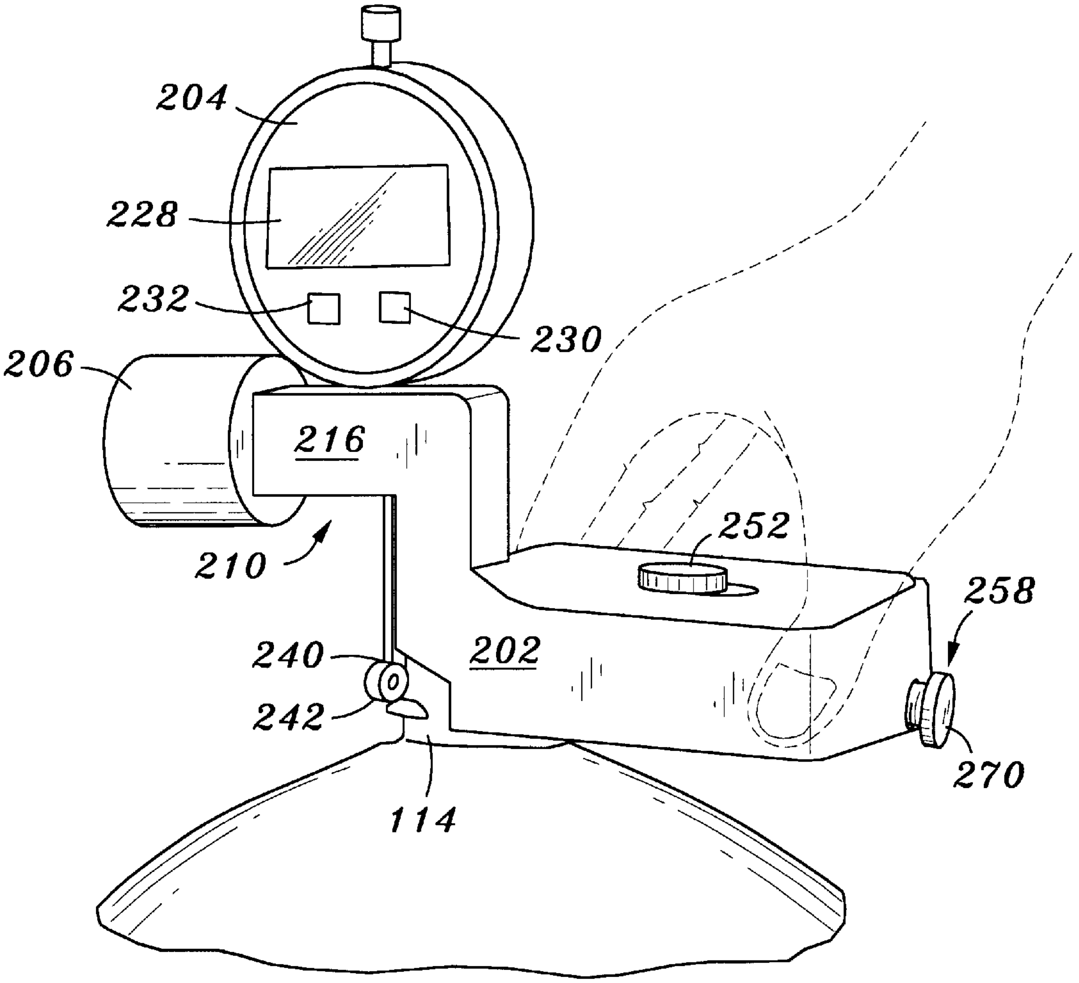
FIG. 5 is a perspective view of the gauge system of the present invention.

The gauge system 200 of the present invention can conveniently be custom manufactured for measuring the S-dimensions of various bottle sizes with differing finish opening diameters. In this embodiment, the gauge system 200 is adapted to operate on bottles having 33 and 38 millimeter finish diameters (FIG. 5). The gauge system may weight about 900 grams. Exemplary dimensions may be 7" length and 2.75" width. The base 202 may have a 1" height, and the overall height of the gauge (including top of gauge 204) may be 6". All machined pieces made from anodized aluminum except support member 242 made from delrin plastic, and the thumb screw is made of brass.

Referring to FIGS. 3A and 3B, during the measuring process, a first region 222 of the bottom surface 214 is placed on the finish surface 136 of the finish 114. A gauge actuator 224 of the gauge 204 is then extended to contact the upper base line 130 of the threads 124, and next the gauge system 200 is rotated towards the thread start point 134 to record the S-dimension. As the gauge system 200 is rotated, the gauge 204 records the distance between the upper base line 130 and the finish surface 136 based on the vertical displacement of the gauge actuator 224.

As illustrated in FIG. 3A, the gauge 204 is placed on the upper surface 220 of the first arm member 216 and comprises a front side 226 having a digital display 228, and control buttons 230 and 232 to control the gauge 204. The control buttons 230 and 232 may serve to perform a variety of functions to control the gauge 204, such as turning on and turning off the gauge 204, setting the zero readout, as well as changing the measurement mode between different units, for example between millimeters and inches. The gauge 204 may have a memory to hold the height measurements as it is rotated. However, measurements may be read off the digital display 228 by a user as well. The gauge 204 may be available from the Fred V Fowler Co, Newton, Mass. and sold under the brand name Ultra Digit Mark V.

Figure 3C:
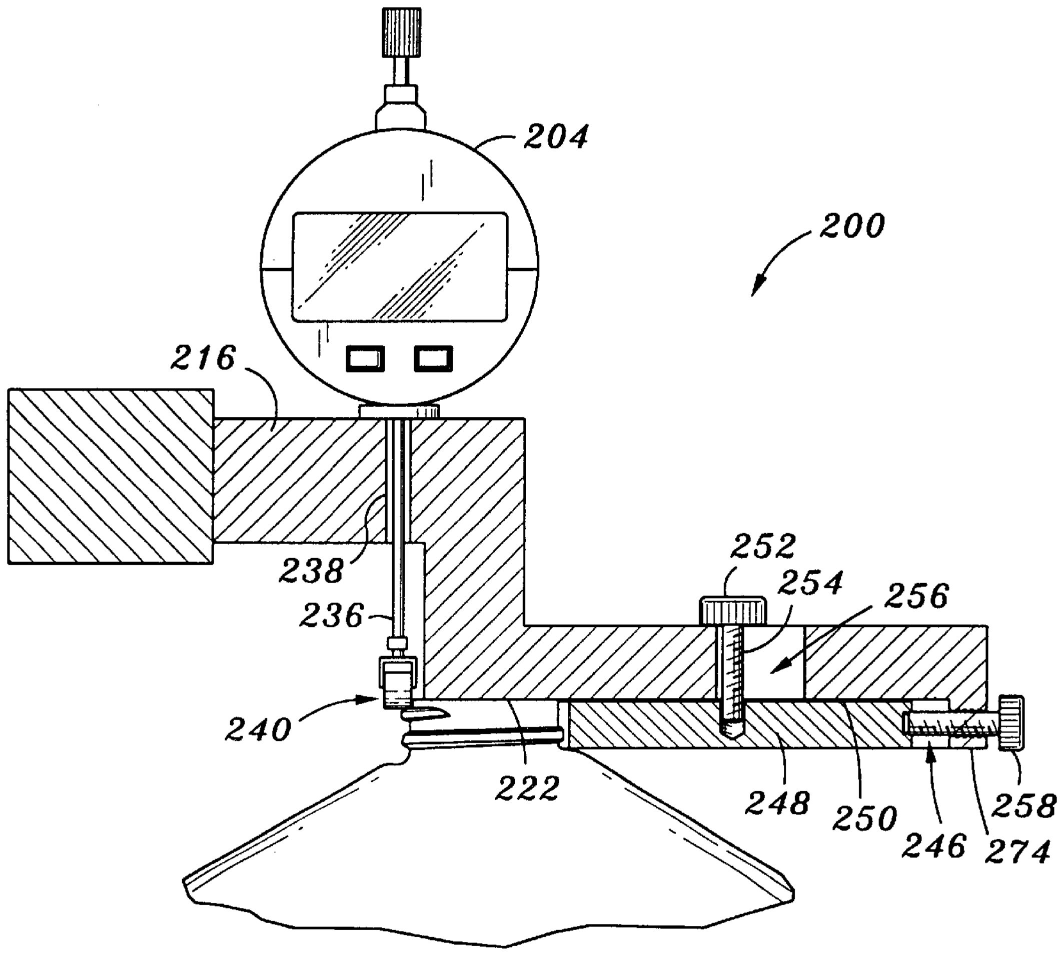
FIG. 3C is a cross-sectional view of the gauge system shown in FIG. 3A.

As shown in FIG. 2B in detail and in FIG. 3B in cross-section, the gauge actuator 224 may comprise a gauge rod 236 extending through a hole 238 formed in the body of the first arm member 216 of the L-bracket 210, and a contact member 240, preferably a roller member, having a roller surface 242 to engage or contact the upper base line 130 of the bottle 100, as in the manner shown in FIGS. 3A–3C. The roller member 240 is movably attached to a first end of the gauge rod 236 using any one of the well known attachment methods in the art. The rotation axis of the roller member 240 is preferably perpendicular to the gauge rod 236. The second end of the gauge rod 236 has a tip 244 for manually controlling the vertical position of the gauge rod 236. As an example, the roller may be sized to have diameter of approximately ⅜" and a width of 5/32". The rod 236 may have a diameter of 5/32". The rod and the roller may be made of hardened and ground stainless steel.

Referring now to FIGS. 3A, 3B, and 3C, the first side 208 of the base 202 comprises an inner cavity 246 to movably retain a support member 248 on a cavity floor 250. The cavity floor 250 is a lateral extension of the bottom surface 214 and is in the plane of the bottom surface 214. During the calibration of the gauge system 200, the support member 248 is contacted with the threads 124 on the finish 114 thereby confining the finish 114 between the roller member 240 and the support member 248. This, in turn, prevents lateral movement of the gauge system 200 but allows rotational movement of the gauge system 200 during the measurements. As will be described in detail below, the support member 248 may be moved into a first position to permit the gauge system 200 to operate on a 38 millimeter finish or it may be moved into a second position to permit the gauge system 200 to operate on a 33 millimeter finish.

As it is moved in the cavity 246 and on the cavity floor 250, the support member 248 moves along a button 252 or a thumb nut which is placed on the top surface 212 of the base 202. The thumb nut 252 holds the support member 248 at the predetermined positions by tightening the thumb nut 252. The thumb nut 252 is connected to the support member 248 by a pin 254. The pin 254 is placed through a second hole 256 formed through the body of the base 204. The second hole 256 may be a rectangular hole allowing the button 252 to switch between the two predetermined positions. As will be described below, the support member 248 can be moved between the predetermined positions by rotating an adjustment screw 258 and hence moving the support member 248 between these predetermined positions. As mentioned, once the position is selected, the thumb nut 252 may be temporarily locked at that position by tightening the thumb nut 252.

Figure 4:
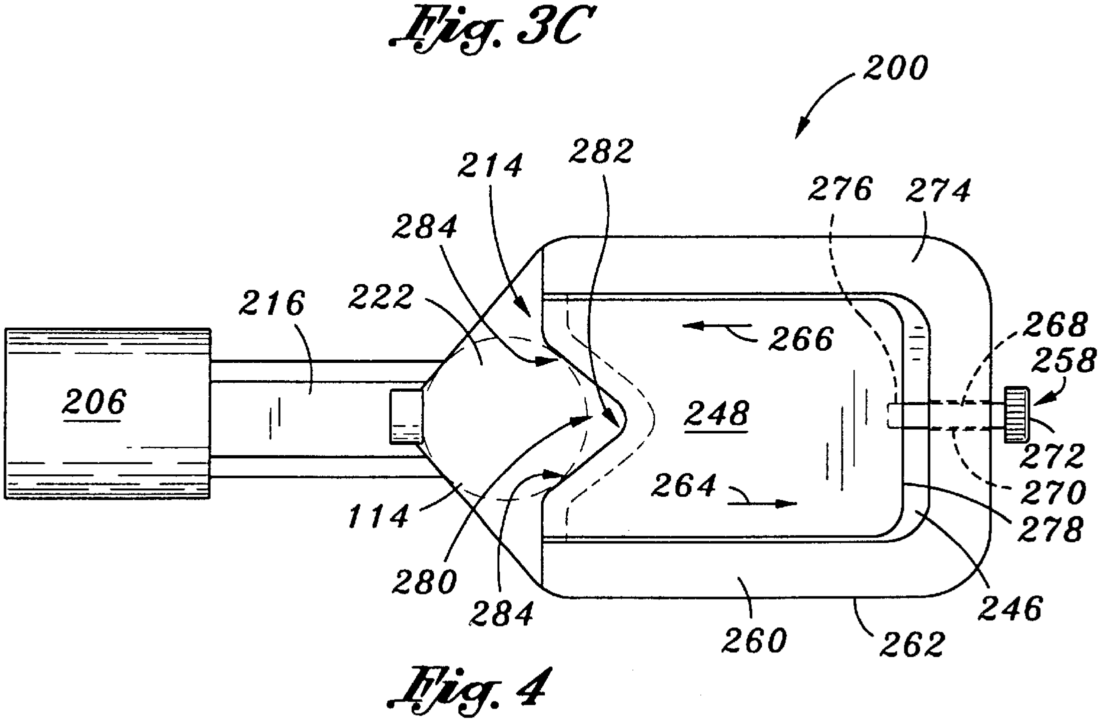
FIG. 4 is a bottom view of the gauge system of the present invention shown in FIG. 3A.

As shown in FIG. 4 in a bottom view, the base 202 is surrounded by a rectangular-U shaped side wall 260 or lip projecting perpendicularly from the bottom surface 214 and extending along an outer wall 262 of the first side 208 of the base 202. The support member 248 is generally rectangular in shape and in engagement with the correspondingly shaped side wall 260. Depending on the diameter of the finish being tested, the support member 248 may be laterally moved in the cavity 246 in a first direction 264 and in a second direction 266 by moving the adjustment screw 258 (FIGS. 3A, 3C and 4). The adjustment screw 258 may comprise a threaded shaft 268 and a knob section 272. The threaded shaft 268 is placed through a hole 270 formed in a rear wall portion 274 of the side wall 260 and engages with a threaded hole 276 formed in a rear end 278 of the support member 248. Depending on the direction of the rotation, the support member 248 moves in the first direction 264 and the second direction 266. When the support member 248 moves in the first direction 264 and into the first position as shown with dashed lines, it contacts the rear wall portion 274 of the side wall. The thread pitch on the threaded shaft is finer than most adjustment screws, which makes the positioning of the support member 248 more precise.

A front end 280 of the support member 248 comprises a V-shaped recess 282 having side walls 284 to contact the finish 114 when the first area 222 of the gauge 200 is placed on top of the finish 114. In this respect, when the larger diameter finish is measured (i.e., the finish diameter of 38 millimeters), the support member 248 is moved in the first direction 264 to provide sufficient space on the first region 222. Accordingly, when the smaller diameter finish is measured (i.e., finish diameter of 33 millimeters), the support member 248 is moved in the second direction 266 to provide enough space on the first region 222 for the finish. In addition, through the side walls 284 the support member establishes two-point contact with the finish which also improves stability of the gauge system 200.

The calibration and measurement of the S-dimension with the gauge system 200 may be exemplified with reference to FIG. 5. As shown, a user may grasp the entire gauge system 200 and place it on the bottle finish 114 as in the manner described above. Then, the calibration of the gauge 204 is initiated by turning it on by the on/off button 230. Next, the gauge 204 is placed on a substantially flat reference surface (not shown) and the roller surface 242 is contacted with the reference surface. The gauge 204 is zeroed using the zeroing button 230 while holding the roller 240 against the flat reference surface. After the calibration step, the measurement process is initiated. During the measurements, the base 202 can be gripped between the thumb and the middle finger while the ring finger is used to rotate the knob 270 permitting one handed operation. Referring back to FIGS. 2A and 2B, accordingly, the knob 270 of the adjustment screw 258 is rotated and the support member is positioned for the desired finish diameter, in this example, 33 millimeters. The gauge system 200 is then placed on top of the finish 114 as in the manner described above and aligned such that the roller 240 rests at the edge of the upper surface 236 of the finish 114. Then, the knob 270 is slowly rotated until the roller 240 slides on the side wall down to the upper base line 130. In order to obtain accurate S-distance measurements, it is important that the roller be placed on the upper base line 130. The finer thread pitch of the adjustment screw 258 advantageously facilitates this adjustment. At this point, the gauge system 200 is rotated so that the roller 140 rolls up to the thread start point 134. The lowest reading displayed on the digital display 228 is recorded as the S-dimension 135. Upon completing the measurements, the on/off button 230 is pressed and the gauge system 200 is turned off. The gauge system may have a measurement range of 0–1" with 0.00005" resolution, 0.0002" accuracy and 0.0001" repeatability.

It should be understood, of course, that the foregoing relates to preferred embodiments of the invention and that modifications may be made without departing from the spirit and scope of the invention as set forth in the following claims.

We claim:

1. A measuring device for measuring the thread start distance of a thread formed on an outer surface of a first container finish, comprising:

a base comprising a first surface for receiving a rim of the first container finish;

a support member movably attached to the base and adjacent the first surface, a side surface of the support member being in contact with the first container finish;

a gauge attached to the base; and a gauge actuator operatively associated with the gauge, the gauge actuator measures a distance between the rim of the first container finish and a thread start point of the thread of the first container finish as the gauge actuator moves along an upper base line of the thread.

2. The measuring device of claim 1, further comprising a counterweight attached to the base, the counterweight balances the measuring device on the first container finish.

3. The measuring device of claim 1, wherein an actuator is connected to the support member for selectively moving the support member between a first position and a second position.

4. The measuring device of claim 3, wherein the actuator is an adjustment screw.

5. The measuring device of claim 3, wherein when the support member is in the first position a first surface of the base receives the first container finish having a first predetermined diameter.

6. The measuring device of claim 5, wherein when the support member is in the second position the first surface receives a second container finish having a second predetermined diameter.

7. The measuring device of claim 6, wherein the first predetermined diameter is larger than the second predetermined diameter.

8. The measuring device of claim 1, wherein the gauge actuator comprises a contact member and a rod.

9. The measuring device of claim 8, wherein a first end of the rod is operatively connected to the gauge.

10. The measuring device of claim 9, wherein the contact member is movably connected to a second end of the rod.

11. The measuring device of claim 10, wherein the contact member is a roller having a rotational axis perpendicular to the rod.

12. The measuring device of claim 11, wherein the contact member is a roller having cylindrical shape.

13. The process of claim 1, wherein the step of moving the support member of the measuring device in contact with a side wall of the container finish comprises contacting a recessed surface of the support member with the side wall of the container finish.

14. The process of claim 13, wherein the recessed surface contacts the side wall of the container finish at two points, thereby stabilizing the measuring device on the container finish.

15. The process of claim 1, wherein the support member is moved by rotating an adjustment screw.

16. A process for measuring the thread start distance of a thread formed on an outer surface of a container finish, comprising the steps of:

positioning a first surface of a measuring device on an upper end of the container finish;

moving a support member of the measuring device in contact with a side wall of the container finish;

contacting a gauge actuator with an upper base line of the thread wherein the gauge actuator is operatively connected to a gauge having a display; and moving the gauge actuator along the upper base line of the thread so as to measure a vertical distance between a thread start point and a rim of the container finish.

17. The process of claim 16, wherein the step of contacting the gauge actuator comprises contacting a roller member with the upper base line of the thread.

18. The process of claim 1, wherein the step of moving the gauge actuator comprises a step of rotating the measuring device until the roller member reaches the thread start point.

19. The process of claim 18, wherein the thread start distance is the shortest distance displayed by the display.

* * * * *